Figure 1:
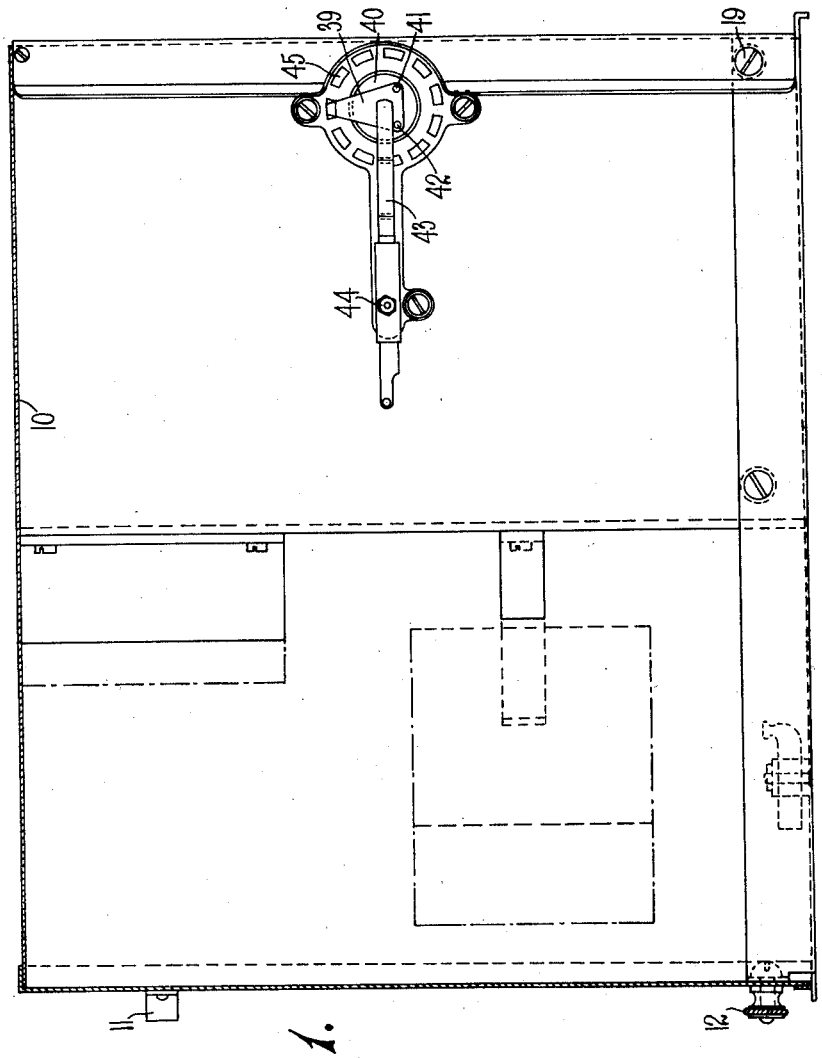

Oct. 17, 1933.  R. N. SAXBY  1,930,540
INDICATING DEVICE
Filed April 13, 1931  5 Sheets-Sheet 1

Inventor
Robert N. Saxby
Wm Walter Axom
Atty.

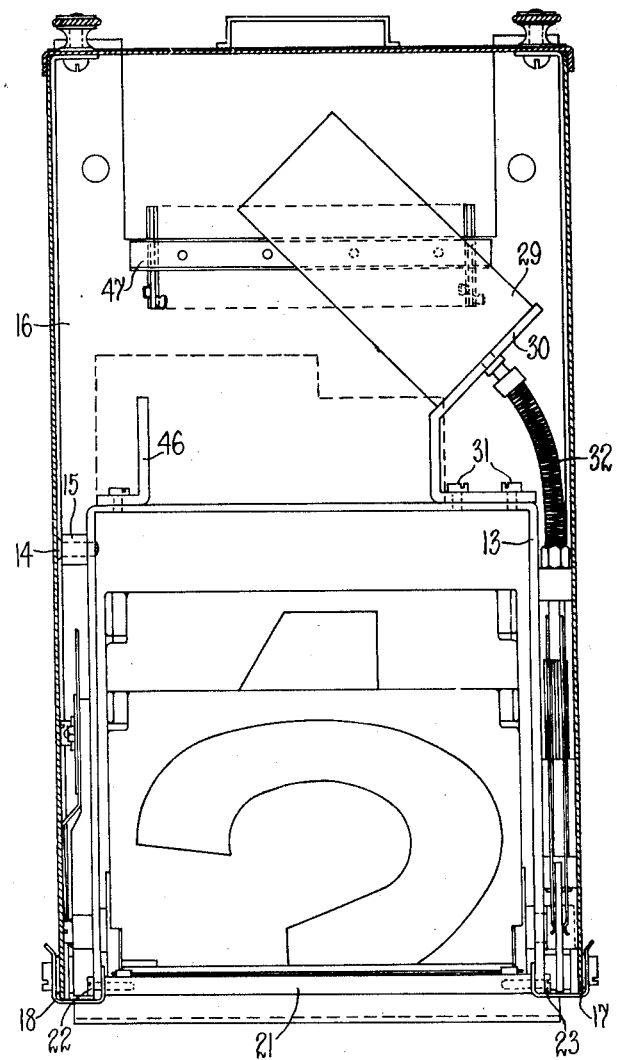

Oct. 17, 1933.  R. N. SAXBY  1,930,540
INDICATING DEVICE
Filed April 13, 1931  5 Sheets-Sheet 3

Inventor
Robert N. Saxby

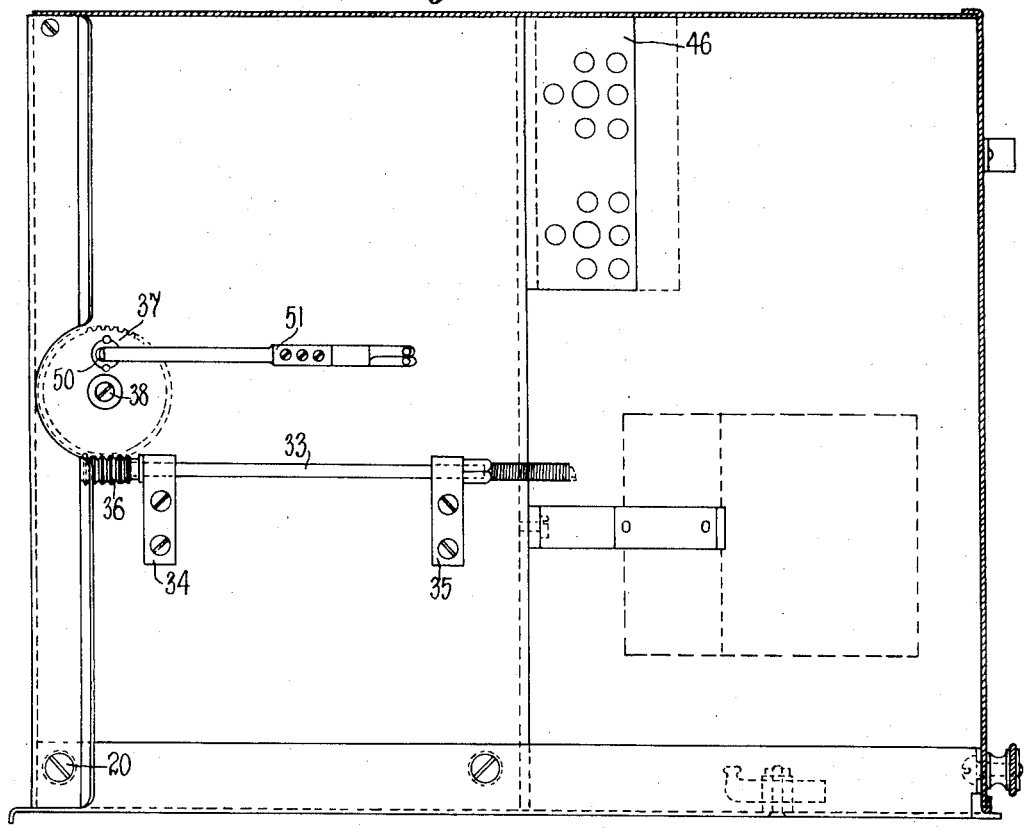

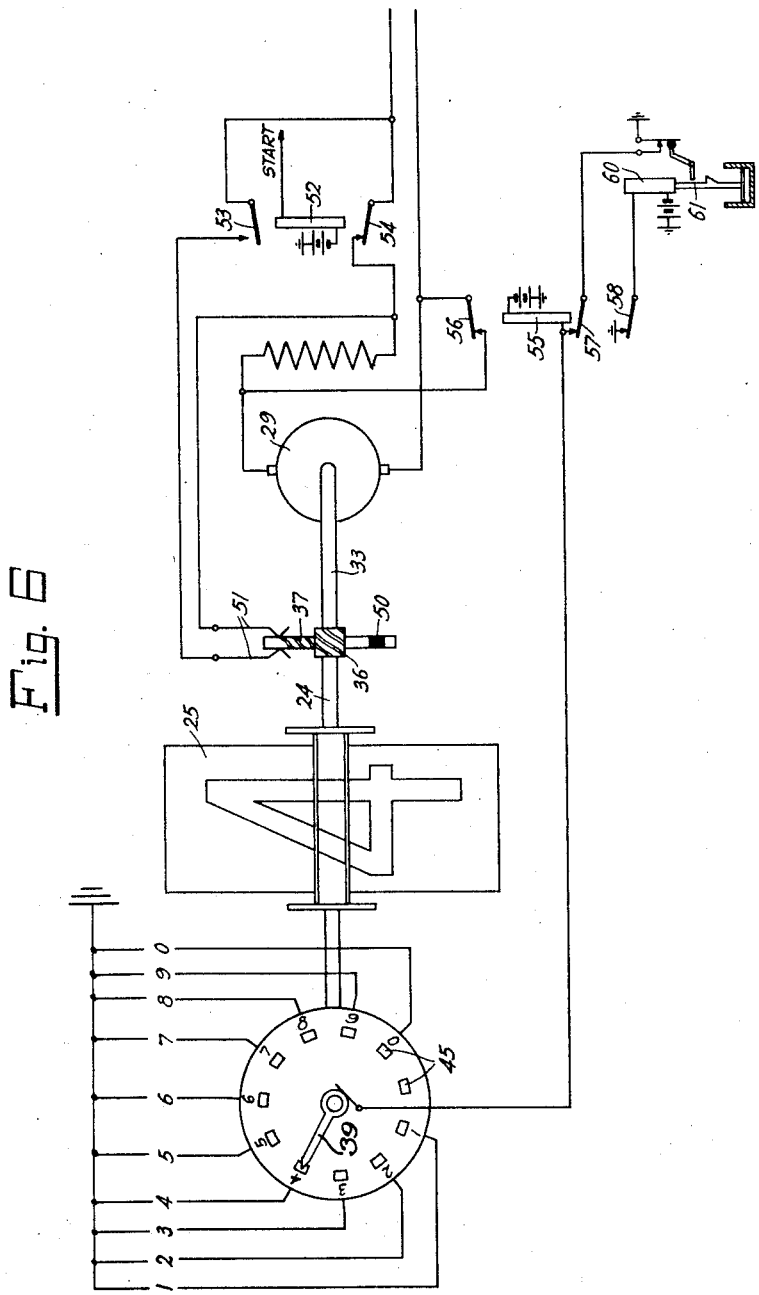

Patented Oct. 17, 1933

1,930,540

UNITED STATES PATENT OFFICE 1,930,540

INDICATING DEVICE

Robert Norman Saxby, Liverpool, England, assignor to Automatic Electric Company Limited, Liverpool, England Application April 13, 1931, Serial No. 529,570, and in Great Britain June 2, 1930

5 Claims. (Cl. 40—53)

The present invention relates to indicating or display devices, particularly those arranged for displaying to a large body of observers numbers or letters which require to be readily changed at will. Such indicators may find application for instance in displaying advertising matter, in train despatching systems, for showing the scores on cricket or other sports grounds, or on racecourses for indicating the progress of ticket selling in connection with totalizer installations. The arrangement, according to the invention, is particularly suitable for this last purpose and, for the sake of convenience, the description which follows will assume the use of the invention in such circumstances.

It has already been proposed to construct indicators in the form of polygonal drums having a different character on each side and arranged so that only one side is rendered visible at a time. The chief objection to such drums is that for a display of adequate size they take up a great amount of space and moreover owing to their large diameter they possess considerable inertia so that it is difficult to secure quick changes of display as is particularly desirable in a totalizer indicator. The object of the invention is to produce a simple mechanical indicator which occupies little space compared with the size of the display and is composed of only a small number of separate parts.

According to the invention, use is made of a series of movable plates pivoted on a rotatable cage of comparatively small diameter and it is preferably arranged that the actual display is made by one side of a plate and the opposite side of the adjacent plate thereby giving an indication twice the size of a single plate. The plates bearing the numerals or other characters will preferably be moved into position by means of a motor or electro-magnet controlled from a distance, although full mechanical control of the indicator is not outside the scope of the invention.

The invention will be better understood from the following description of one method of carrying it into effect in which it is assumed that the operation of the plates is effected mechanically while the control is effected electrically. It is assumed, moreover, that the arrangement is used in a totalizer system of the type described in the application of L. M. Simpson, Serial No. 430,414, filed February 21, 1930, and is adapted to display any one of the ten numerals in response to potential connected to a particular one of ten control leads.

Figure 4:
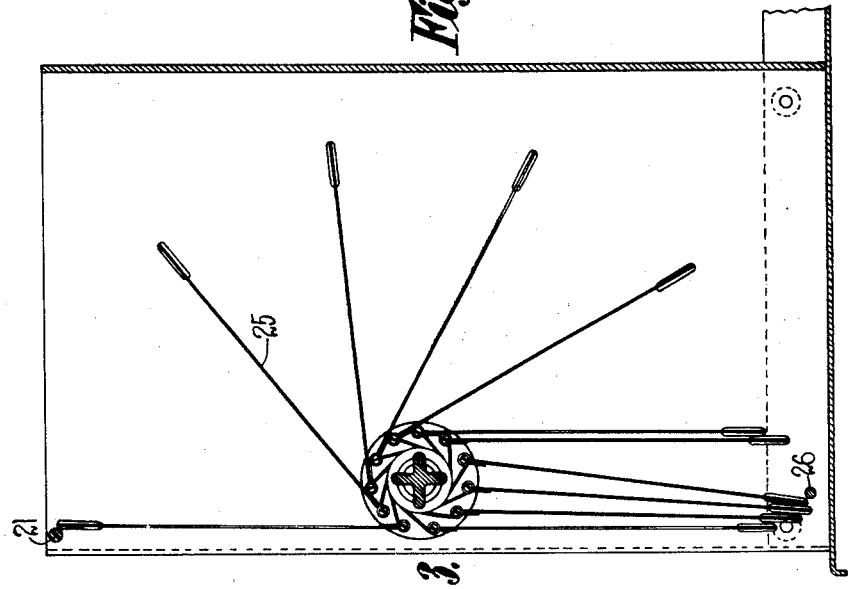
Figure 3:
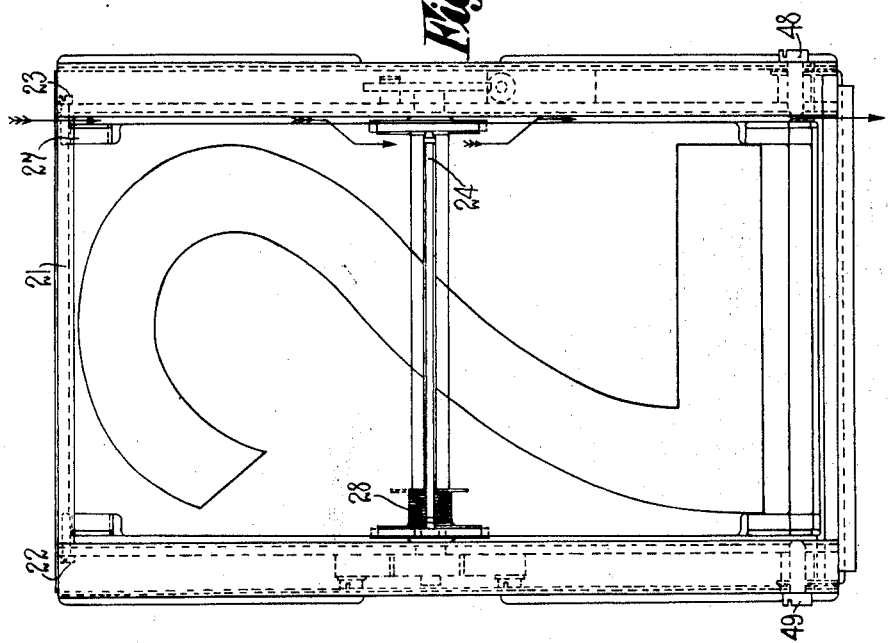

Referring now to the drawings, Fig. 1 shows a left hand side view of the indicator, Fig. 2 shows a plan view with the cover removed, Fig. 3 shows a front view of the indicator, Fig. 4 shows a sectional view of Fig. 3 through the track indicated by the arrows and illustrates more clearly the manner in which the indicating plates are pivoted to the rotating cage, Fig. 5 shows a right hand side view of the indicator and details the driving mechanism, and Fig. 6 shows a diagrammatic representation of the apparatus and the control circuits therefor.

It will be seen from reference to Figs. 1 and 2 that the indicator presents the appearance substantially of a rectangular box shaped unit enclosed by the dust cover 10 which is provided with the handle 11 and may be removed by undoing the knurled finger nuts 12 so that the cover may then be withdrawn by a sliding movement to the left. With the cover removed, the left hand and right hand side views shown in Figs. 1 and 5 will be exposed as also will be the plan view shown in Fig. 2. In the drawings it has been convenient to show the cover in part section so as to clearly indicate its position without interfering with the descriptive views required. The main framework of the indicator, to which the various components are mounted, is shown more clearly in Fig. 2 and comprises a substantially square shaped metal pressed member 13 open at the front to allow for the movement of the indicating plates and secured by means of countersunk screws such as 14 and spacing washers such as 15 to a substantially tray shaped base member 16. As will be seen from the views Fig. 1 and Fig. 5 the longer dimension edge of the base is turned up into the form of a lip through which the fixing screws referred to are screwed, while the rear ends of the lip are cut and turned over at right angles and drilled to accommodate the knurled nuts and fixing screws by means of which the dust cover 10 is locked in position. To the front edges of the pressed metal mounting 13 are secured channel shaped members 17 and 18 shown also in Figs. 1 and 5. There are held in position at their lower extremity by means of the screws 19 and 20 which pass through suitable holes therein, and are threaded into the walls of the pressed metal mounting member 13. Tubular washers of substantially the same depth as the channel shaped members are threaded over the fixing screws so as to fit flush with the side of the mounting member 13 and the sides of the channel members 17 and 18 to provide the necessary clamping means. The upper ends of the channel shaped members are clamped to the pressed metal mounting member 13 between the ends of the cross pillar 21 and the smaller fixing screws 22 and 23 which are threaded therein. The cross pillar 21, in addition to serving the purpose of a bracing member, performs the function of a plate stop in a manner which will be described later. The outer edges of the channel shaped members 17 and 18 are turned outwards into the form of a tapering lip so as to act as a guide to the dust cover 10 when this is pushed home.

Referring now particularly to Figs. 3 and 4 it will be seen that the rotating axle carrying the indicating plates comprises essentially an elongated bobbin shaped member 24 freely supported between the walls of the pressed metal mounting member 13 on suitable bearing bushes. Between the ends of the bobbin are supported eleven rods spaced at equal distances around the circumference so as to form in effect a circular cage. This member is shown more clearly in the section view Fig. 4 and it should be explained that the bobbin shaped mounting axle is conveniently in this instance an aluminium die casting, formed as shown with a centre spindle in the shape of a cross for the sake of rigidity and lightness in weight, and has its ends splayed out into a bell shaped form in order to provide accommodation for the bearing bushes, while the edges of the bell are moulded into an extended rim between which the supporting rods are secured at regularly spaced intervals. Pivoted freely to each rod of the cage is a rectangular plate such as 25 comparable in size with the diameter of the cage and secured in position by turning one of its edges around the rod so as to form in effect a bearing sleeve. Alternatively the plate may be secured in position by means of lugs pressed out during the construction of the plate and drilled to accommodate the rod.

When now the circular mounting cage or axle as it may be more correctly termed is rotated in an anti-clockwise direction by driving means, which will be described in detail later, the separate plates will be carried around so that each will be raised in turn to a vertical position pointing upwards after which further movement of the cage will result in the vertical plate falling by gravity through approximately 180° so that it is then pointing downwards. The falling of each plate in turn will therefore cause the indication which is inscribed thereon to be brought into view from the front of the indicator.

In certain circumstances the surface area of one plate alone may not be considered sufficient to carry an indication of the desired size and it has been arranged therefore to utilize the surface area of two plates at the same time without in any way complicating the mechanism. This arrangement has in fact been illustrated in the particular example chosen and is effected by providing a stop to arrest the fall of the plates from the upper to the lower position. Conveniently in this construction the bracing rod 21 extending across the front of the indicator has been used for this purpose, and is so positioned that when a plate passes its vertical position it will then fall slightly forward so as to come to rest against the rod. In this position the upper plate will now be in substantially the same vertical plane as the previous plate which has already dropped to its lower position, so that by this means the surface area of both plates may be used in common to provide one large indication. It will be understood that each plate will be inscribed on either side with one half of a numeral the numerals being different on the two sides, and referring by way of example particularly to Fig. 3 it will be seen that the upper plate will carry the upper portion of the numeral 2 on one side, while on the other side of the same plate the lower portion of the numeral 3 will be inscribed. Further movement of the cage from the position referred to will cause the plate in question which is resting against the stop bar 21 to be lowered clear of it so that it then falls by gravity into a lower position against the preceding plate, while the following plate will be raised in turn past its vertical position to fall against the stop bar so that in combination with the lower plate it will provide another indication. Conveniently also a lower stop member 26 is secured across the front of the indicator in the position shown in Fig. 4 arranged to pass through convenient holes in the walls of the pressed metal mounting member 13 and is confined to this position by the turned up edges of the tray shaped base. In operation the action of this stop will be such as to cause a number of plates to pile up in the manner shown in Fig. 4, and these will be released in turn as the lifting motion of the cage raises each plate in turn to a point just above stop 26. The lower stop therefore forms a support for the plates when they fall into their lower position since otherwise they would be free to swing in a loose fashion and possibly be influenced by weather conditions when the box is situated in an exposed position. The corners of each plate are nicked in the manner shown in Fig. 3 and equipped with rubber bushes 27 which are sprung into position. These bushes serve the purpose of resilient buffers when the plates fall from the upper to the lower position thereby eliminating shock and reducing the mechanical noise of the indicator. In certain circumstances where exceptionally rapid operation is contemplated it may be desirable to augment the gravity release of the plates by a spring or other suitable means which will increase the speed of the releasing movement. These springs shown as 28 in Fig. 3 are mounted to the left hand end of the rods comprising the cage and arranged so that one arm will bear against the rear of the plate, while the other arm of the spring will rest against the hub of the cage in the manner shown in Fig. 4. Consequently when the plate is lowered clear of the stop bar it will be thrown forward by the spring into its lower position. In order that the dividing line between the upper and the lower plates shall not be so conspicuous as to impair the satisfactory definition of the numeral the intervening space may be masked by suitable strips of metal secured between the rods of the cage and painted with the middle strip of the numeral.

As regards the means for operating the mechanism, a small electric motor has been employed in this instance designated 29 which may be of any well-known type secured to the off set bracket 30 which is in turn fastened to the rear of the pressed metal mounting member 13 by the screws 31. The drive from the motor is transmitted through a helical spring 32 to a driving shaft 33 shown more clearly in Fig. 5, which is supported between suitable holes in the fibre blocks 34 and 35 secured to the side of the frame and carries at its end the driving worm 36. The worm 36 is arranged to mesh with a worm wheel 37 which is locked by means of the screw 38 to the spindle of the circular cage previously referred to. Consequently when the motor is set in motion from suitable circuit means, the drive will be transmitted through the spring and worm gearing so as to bring about the rotation of the cage carrying the indicating plates which are brought into view one after the other. In order to provide a ready means of arresting the movement of the cage in the desired positions for displaying the numbers inscribed thereon, the opposite end of the cage spindle is equipped with a wiper 39 shown more clearly in Fig. 1 arranged to wipe over a circular bank of contacts corresponding in number to the separate displays available. In order that the wiper shall be insulated from the frame of the indicator it is arranged that the end of the spindle extending through the supporting wall is provided with an insulated ring 40 composed of bakelite or other suitable material, into which are let two pins 41 and 42 to form the support for the wiper blade 39 which comprises a triangular shaped flat piece of metal provided with holes spaced to accommodate the mounting pins while the smaller dimension end which is arranged to wipe over the contracts shown is turned over and rounded into the form of a shoe so as to provide a good slidable contact. The wiper blade is held in position by means of a flat spring 43 which is clamped by means of the nut and bolt 44 to an extension of the insulated member carrying the contact studs. Conveniently the spring is holed at one end to accommodate a pin let into the wiper blade, while the other end is formed into a connection tag through which electrical connection to the wiper may be made. As regards the contact bank this comprises a moulded ring provided with an extended arm to which the wiper clamping spring 43 is secured, while three moulded lugs are also provided in suitable positions to enable the ring to be clamped to the side of the mounting frame by means of screws shown. The contact studs 45, spaced at equal distances around the circumference of the ring, may take the form of flat strips of metal bent over at the ends which are pushed through suitable slots in the insulated ring and turned over at the back to hold them in position. Conveniently also one end of the strip may be formed into the shape of a tag to which electrical connection may be made and for this purpose the ring itself is cut away to approximately half the thickness of the other part of the moulding so as to provide adequate space for making the connection at the rear. Two relays, 52 and 55, are also contemplated in the control of the indicator and although these have not been shown anywhere except in Fig. 6, they must be assumed to be secured to the angle bracket 46 shown in Fig. 2 or 5 so as to occupy approximately the space outlined by the dotted bounding line shown.

An understanding of the circuit functioning may be had from Fig. 6. The relay 52 is connected to the start lead to which ground potential is connected when it is desired to operate the indicating apparatus and to which conductor that potential remains connected as long as it is desired to use the indicating apparatus. In the assumed employment of the instant apparatus, the ground potential will be connected to the start lead at the commencement of a ticket selling period and will remain connected throughout that period. Therefore, relay 52 remains energized throughout the selling period and, at its armature 54 and make contact, maintains the operating circuit of the motor 29 closed. Motor 29 thereupon operates to rotate the shaft 33 and consequently the shaft 24 through the worm 36 and gear 37.

Rotation of the shaft 24 rotates the plates 25 and the wiper 39. As soon as a ticket-issuing machine is operated to issue a ticket, ground potential is connected to the #1 contact of wiper 39. When the wiper engages this #1 contact, relay 55 which is connected to the wiper 39 energizes and at its armature 56 and make contact short-circuits the armature of the motor 29, quickly stopping the motor and consequently the rotation of the number bearing plates 25. The contacts 45 are so arranged that wiper 39 engages each contact as the corresponding number carried by the plates is in the display position.

As ticket-issuing takes place, the potential will be connected to the various contacts in sequence. In the illustration in Fig. 6, it has been assumed that the wiper 39 has just encountered ground potential on the #4 contact and that relay 55 has just energized to short-circuit the motor armature at its armature 56 and make contact.

It is desirable in the case of rapid ticket-issuing to arrange that a number shall be exhibited for at least a minimum length of time. This may be accomplished by having the relay 55, upon energizing, lock itself to a circuit in which ground potential is maintained for a definite interval. By reference to Fig. 6 it will be noticed that at its armature 57 and make contact, relay 55 locks itself to ground through the normally closed contacts of slow-acting relay 60 and that at its armature 58 and make contact, relay 55 completes the circuit of relay 60. Relay 60 is here represented as a dash-pot relay of any well-known type, and this relay slowly elevates its plunger 61 when its circuit is completed and in time opens the locking circuit of relay 55.

If at this time ground potential has been removed from the #4 contact, the relay 55 will deenergize, removing the short-circuit of the motor armature and opening the circuit of the dash-pot relay 60. The motor will then function to rotate the shaft and wiper until the wiper encounters another grounded contact. If the locking circuit of relay 55 is opened before ground potential is removed from the contact engaged by the wiper 39, relay 55 will remain operated until that potential is removed, whereupon the relay deenergizes to remove the short-circuit of the motor armature.

The connection of the ground potential to the contacts of wiper 39 may be accomplished in the manner most suitable to the system in which this indicating apparatus may be employed. Also, ground potential may be connected to the contacts promiscuously or in a definite sequence or order, depending upon the use to which it is put.

It is to be understood that the locking of relay 55 to the timing circuit is optional. When not employed, the relay 55 will remain energized only as long as the potential remains connected to the contact with which wiper 39 is in engagement.

The indicator unit is constructed in a manner such as to be readily transportable by arranging that the electrical connections extending therefrom are wired to a terminating strip 47 shown more clearly in Fig. 2, and provided with a plurality of insulated connecting points two of which are shown at either end of the strip. Each wire extending from the indicator is taken to a separate terminal point on this strip which is constructed so that ready connection may be made with a corresponding set of spring connecting links which may be wired in a permanent position to a rack or mounting shelf. Such spring connecting means are already well known in the telephone art and their application in the circumstances mentioned is of particular service, since it is of importance that the indicator units may be quickly removed and replaced in case a fault occurs so as not to interrupt the progress of ticket selling. In addition to the main dust cover 10, which may be left permanently in position while the indicator is in use, a further cover is also provided for the front of the indicator to prevent the possibility of damage to the indicating plates during transportation. Although this front cover has not been shown in the drawings, it should be explained that it comprises a flat plate with turned over edges formed into the shape of a groove, to accommodate the edges of the channel shaped members 17 and 18 previously referred to. The cover is fitted by suspending it over the top of the channel shaped members and thereupon pushing it down until its contacts with the heads of the clamping screws 48 and 49 in which position the front of the indicator is then enclosed.

In order that the indicator may be restored to a home position which is not inscribed with a numeral or letter, the work wheel 37 shown in Fig. 5 and Fig. 6 is provided with an insulated plug 50 which is driven into a hole in the wheel flush with both sides and gagged in position by bob-punching the edges in one or more positions in the manner shown. The wheel is arranged to rotate between the spring assembly 51 which is secured to the side of the mounting frame and comprises two insulated springs arranged to establish electrical contact with the two sides of the worm wheel respectively. In one position of the wheel the springs will contact with the insulated plug and conveniently this position will be arranged to coincide with a showing on the indicator which is blank, thus constituting a home position. In all other positions the springs will establish electrical connection with the wheel and conveniently they are included in a circuit to the driving motor which is controlled by the resting armature 53 of the relay 52 arranged to be operated at the commencement of ticket selling. Consequently at the end of the selling period when the relay is released the circuit referred to will become operative to drive the indicator to its home position and when this is reached the circuit is opened by the insulated plug.

What I claim is:—

1. In an indicating device, a rotatable shaft carrying means having characters adapted to be moved through a display position one after another as said shaft rotates, an electric motor normally conditioned to rotate said shaft, a control wiper carried by said shaft and rotated thereby, a plurality of contacts engaged by said wiper as said shaft rotates, and corresponding to the character to be displayed, said contacts adapted to have potential connected thereto, and means responsive to the encountering of a said potential on one of said contacts by said wiper for short-circuiting the armature of said motor to immediately stop the motor to arrest said shaft and thereby arrest said wiper on said one contact.

2. In a control system, a rotatable shaft, an electric motor for rotating said shaft and having a continuously closed operating circuit, a wiper carried by said shaft and rotated thereby, a plurality of contacts engaged by said wiper one after another as said shaft rotates, said contacts adapted to have a marking potential connected thereto for variable lengths of time, and means responsive to the encountering of the marking potential on one of said contacts by said wiper for short-circuiting the armature of said motor to immediately stop the rotation of shaft to arrest the wiper on said one contact, whereby said short-circuiting means is effective to maintain said armature short-circuited as long as the marking potential remains connected to said one contact.

3. In a control system, a rotatable shaft, an electric motor for rotating said shaft and having a continuously closed operating circuit, a wiper carried by said shaft and rotated therewith, a plurality of contacts engaged by said wiper as said shaft rotates, said contacts adapted to have a marking potential connected thereto for varying lengths of time, a relay connected to said wiper and energized whenever said wiper encounters said potential on one of said contacts, a holding circuit for said relay, and timing means for opening said holding circuit a definite length of time after the energization of said relay, said relay having means operated upon the energization thereof for locking itself to said holding circuit, for operating said timing means and for short circuiting the armature of said motor to arrest the rotation of said shaft and to bring said wiper to rest in engagement with said one contact, whereby said armature is maintained short-circuited and said shaft is maintained at rest for at least said definite length of time.

4. In a control system, a rotatable shaft, an electric motor for rotating said shaft and having a continuously closed current supply circuit, whereby said motor is normally energized to rotate said shaft, a contacting brush mounted on said shaft and rotated therewith, a series of contacts arranged to be engaged by said brush as said shaft rotates, said contacts adapted to have marking potential connected thereto for varying lengths of time, means effective whenever said brush encounters a marked contact to short-circuit said motor to immediately arrest the rotation of said shaft to maintain said brush in engagement with the marked contact, whereby said short-circuiting means is maintained effective to maintain the motor short-circuited as long as said contact remains marked, and timing means operated by said short-circuiting means for causing said short-circuiting means to maintain the motor short-circuited for at least a definite length of time whenever the marking potential on said contact is of a duration less than said definite length of time.

5. In a control system, a rotatable shaft having a normal position, an electric motor for rotating said shaft, a circuit controlling device having a pair of make contacts and a pair of break contacts, a main energizing circuit for said motor including said make contacts, said circuit being closed while said device is operated and open while said device is restored, whereby said motor is energized and said shaft is rotated as long as said circuit is closed, a pair of springs, a co-operating contactor carried by said shaft and adapted to conductively connect said springs together except while said shaft is in its normal position, and an auxiliary energizing circuit for said motor including said springs and break contacts and closed whenever said device is restored while said shaft is out of its normal position, whereby said motor is maintained energized upon the opening of said main shaft until said shaft is rotated to its normal position.

ROBERT N. SAXBY.